United States Patent
Räke et al.

(10) Patent No.: US 6,414,982 B1
(45) Date of Patent: Jul. 2, 2002

(54) DEVICE FOR MELTING AND/OR REFINING INORGANIC COMPOUNDS

(75) Inventors: Guido Räke, Ruemmelsheim; Michael Kohl, Ingelheim; Hildegard Römer, Karben; Wolfgang Schmidtbauer; Werner Kiefer, both of Mainz, all of (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/641,992

(22) Filed: Aug. 18, 2000

(30) Foreign Application Priority Data

Aug. 21, 1999 (DE) .......................................... 199 39 778

(51) Int. Cl.⁷ .................................................. H05B 6/06
(52) U.S. Cl. ........................... 373/147; 373/27; 373/59; 373/148
(58) Field of Search .............................. 373/27, 39, 40, 373/138, 7, 147, 148, 149, 150, 151, 59; 219/664

(56) References Cited

U.S. PATENT DOCUMENTS

| 1,286,395 | A | | 12/1918 | Northrup |
| 3,867,563 | A | * | 2/1975 | Laflin .......................... 373/149 |
| 4,780,121 | A | | 10/1988 | Matesa .......................... 65/134 |
| 5,789,721 | A | * | 8/1998 | Hayashi et al. ............. 219/664 |
| 5,889,812 | A | * | 3/1999 | Schlickebier ................ 373/149 |
| 6,148,019 | A | * | 11/2000 | Fishman et al. ............ 373/147 |

* cited by examiner

*Primary Examiner*—Tu Ba Hoang
(74) *Attorney, Agent, or Firm*—Baker & Daniels

(57) ABSTRACT

A high-frequency device for melting and refining inorganic compounds having a high-frequency oscillation system and a crucible. The high-frequency system includes an induction coil looping around the crucible and at least two oscillator circuits connectable in parallel to the induction coil and providing redundant high frequency energy. Each self-exciting oscillator includes one of the capacitors and the induction coil. The device may further include a power supply, a control cabinet having operating units, and a process control system.

6 Claims, 1 Drawing Sheet

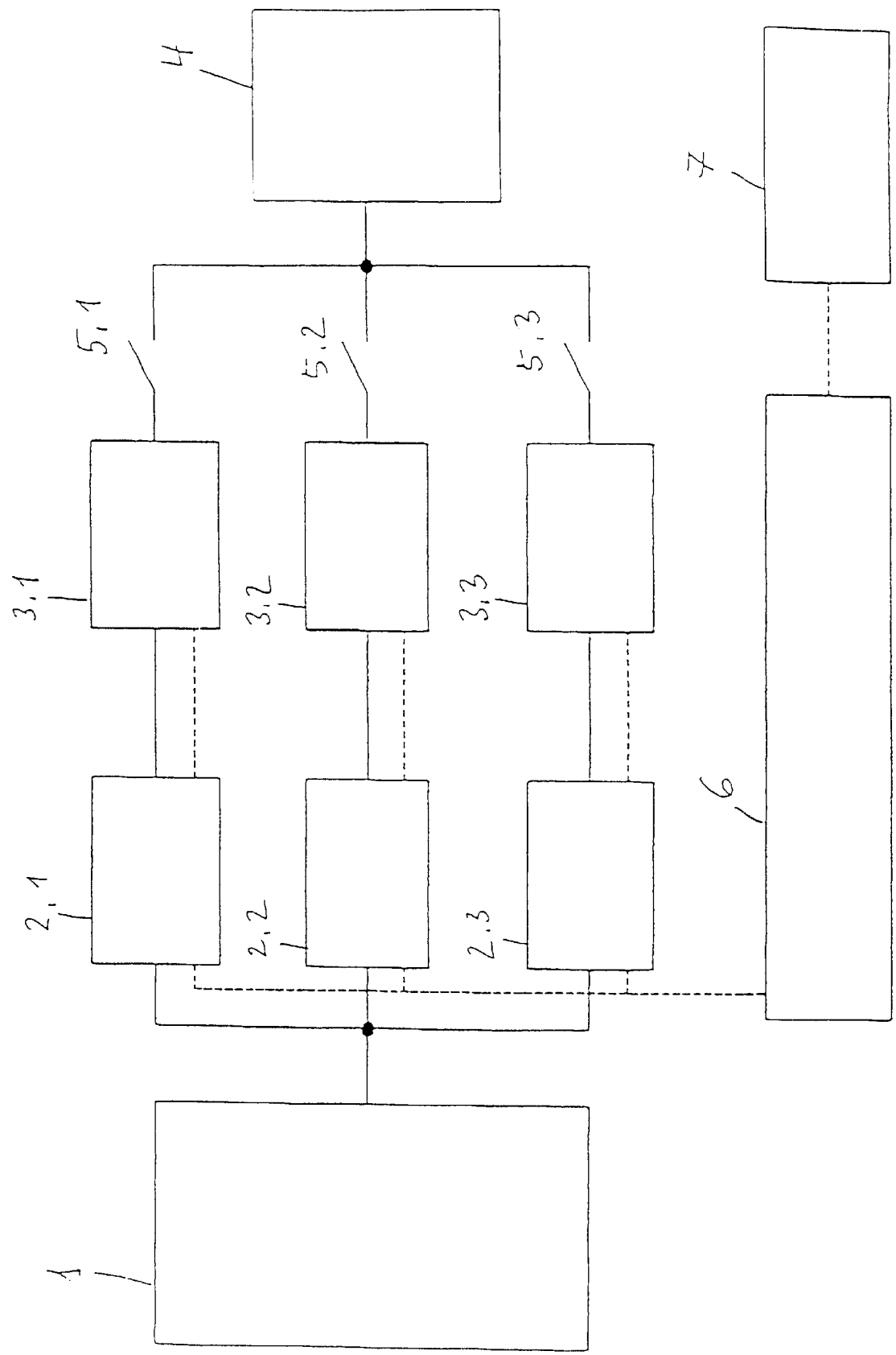

DEVICE FOR MELTING AND/OR REFINING INORGANIC COMPOUNDS

BACKGROUND OF THE INVENTION

1. Field of the Invention

The invention relates to a device for melting and/or refining inorganic compounds, particularly broken glass or so-called batches as a starting material for glass.

2. Description of the Related Art

Such devices comprise a container for receiving the material to be heated, i.e. the broken glass or batch, and also a high-frequency system for heating the material by means of supplying high-frequency energy to the material in the container. The high-frequency system comprises a high-frequency oscillation circuit having an induction coil looping around the container and an oscillator.

Generally, the container is a crucible which is transparent with respect to the high-frequency radiation. It may consist of ceramic material, quartz glass or slotted metallic material. The glass or the melt, respectively, initially has to be preheated using means other than the high-frequency energy so as to achieve a certain minimum conductivity for the material. Once the connection temperature is reached the energy may be supplied via irradiating high-frequency energy.

The walls of the crucible have to be cooled. This is achieved by means of heat dissipation or by active air- or water-cooling, for example. A relatively cold crust of the characteristic material, thus the glass, is then formed in the wall area.

Devices of the above type are known in the art based on the following, for example:

WO 92/15531

DE 33 16 546 C1

U.S. Pat. No. 4,780,121 A1

JP 57-95834.

The device according to WO 92/15531 operates continuously. The energy for heating the crucible is supplied by one single high-frequency generator. This is also the case in devices according to DE 33 16 546 C1 and U.S. Pat. No. 4,780,121 A1.

The device according to JP 57-95834 has a crucible having a relatively large axial expansion. In order to operate the crucible with varying temperature ranges two high-frequency generators are provided each of which operates an inductor. As a result of a varying output from the generators the temperature profile can be set along the crucible.

The above mentioned electrical units are highly stressed in view of the high energy density. Therefore, the possibility that one of the units will fail must be taken into consideration. This applies particularly to continuous operation, such as a device according to WO 92/15531. The stress on the system is magnified because of the continuous operation compared to the batch operation.

Accordingly, the risk that one of the units will fail is particularly high in continuous operation. Furthermore, the consequences of a breakdown are particularly serious. For example, the following may occur: A breakdown in the energy supply will result in a temperature drop which decreases the conductivity of the melt. From a certain temperature on the high-frequency energy can no longer be connected. The melt will solidify. Once the continuous glass flow has stopped, however, reconnecting by means of high frequency is not possible after the defect has been repaired because the glass is cold and thus it has a low electric conductivity and is unable to absorb high-frequency energy.

Because of the above circumstances in practical application the industry has refrained from using devices of the above described type, or systems equipped with said devices, for continuous operation.

BRIEF SUMMARY OF THE INVENTION

The object of the invention is to design a device of the above described type such that the risks of continuous operation are minimized or largely eliminated.

The present invention provides a device for melting and refining glass and ceramic compounds, and also for heating the compounds for crystal growing. The device includes a crucible for receiving the compound to be heated and a high-frequency system for supplying high frequency energy to the compound. The high-frequency system includes a first self-exciting oscillation circuit having an induction coil looping around the crucible and a capacitor connectable to the induction coil.

The high-frequency system further includes at least a second self-exciting oscillator that includes the induction coil and a second capacitor connectable to the induction coil. Both the first and second oscillators are connectable with the induction coil individually or jointly and are operable as an oscillation circuit without the necessity of a change of the remaining oscillator circuits. The high-frequency system may further include a third self-exciting oscillator. An advantage of this arrangement is that a failed oscillator can be removed from the high-frequency system while the remaining oscillators continue operating alone.

BRIEF DESCRIPTION OF THE SEVERAL VIEWS OF THE DRAWING

FIG. 1 is a block diagram of the preferred embodiment of the high-frequency oscillator system.

DETAILED DESCRIPTION OF THE INVENTION

The high-frequency device for melting and refining inorganic compounds comprises a high-frequency oscillation system and a crucible. The high-frequency system comprises an induction coil 4 looping around the crucible and at least two oscillator circuits connectable to the induction coil and providing redundant high frequency energy. Each self-exciting oscillator comprises one of the capacitors and the induction coil 4. The capacitors consist of individual capacitor batteries housed in an oscillator housing. The device may further include a power supply 1, a control cabinet 6 having operating units, and a process control system 7.

In accordance with the invention the high-frequency system comprises a single induction coil looping around the crucible, as is known in the art, but it comprises at least two oscillators. These two oscillators are connectable with the induction coil either alone or jointly. Three or more such oscillators are also feasible, depending on the energy requirements.

The oscillators and the power packs each are housed in a separate housing. The oscillator component that determines the frequency is an oscillation circuit.

Said oscillation circuit comprises the induction coil and a capacitor consisting of an individual capacitor battery which is housed in the oscillator housing.

The oscillator outputs are connected with the inductor via switches. When all switches are closed (i.e. all oscillators are connected to the inductor) the result is a total HF output because the oscillators are now connected in parallel.

The capacitor batteries are also connected in parallel.

Each individual capacitor battery can operate together with the coil as a functional oscillation circuit without requiring a modification in the remaining oscillator connection. This represents the high advantage of the invention. It allows for removing only the failed oscillator from the overall system while the remaining oscillators continue operating alone.

In the event of a breakdown, the following will occur in detail:

When a generator fails (because of a defective component, for example) all three generators are turned off initially. If the malfunction cannot be repaired within a short time ("short time" means the period of time after which the temperature is too low for connection) the defective generator is separated from the inductor by means of the switch. The system is now able to operate with two generators without requiring any further modifications.

The defective generator can be repaired and serviced. An auxiliary inductor can be used for testing the generator by means of reconnecting the lugs. Said auxiliary inductor is located on the roof of the oscillator housing. Accordingly, the generator can be repaired and tested while it is separated from the overall system.

When the repair has been completed the overall system is stopped, the repaired generator is reconnected and the operation resumes with all three generators. The advantage of this method is that a continuous glass flow through the crucible will be ensured even if a generator should fail. The temperature in the crucible being too low as a result of the reduced HF supply is acceptable because stopping the glass flow would be even more critical.

With the proper dimensioning, even operating with only one oscillator is sufficient for maintaining the glass flow. In other words: Two of the three generator branches may fail at any time without interrupting the continuous melting process. Consequently, the operational reliability has been considerably improved with this concept.

In standard operation the output of the oscillators is preset via a common set-point adjuster. The set-point is provided to each connected oscillator. A symmetry controller compares the actual anode current values of the individual oscillators and corrects the set-point in case of a deviation.

In order to operate an oscillator in the event of a repair each oscillator additionally has its own operating unit which is active only when the output switch is open.

The invention is described in more detail by means of the enclosed block diagram.

The following details are shown:

A power supply 1 precedes three power packs 2.1, 2.2, 2.3. A self-exciting oscillator 3.1, 3.2, 3.3 is attached to each power pack. The oscillators can act jointly or individually on an inductor 4. The oscillators convert the direct current output into a high-frequency output. The three power packs 2.1, 2.2, 2.3 and the three oscillators 3.1, 3.2, 3.3 each are housed in a separate housing. The inductor is wound around a crucible in the manner known in the art.

If the oscillator outputs are connected with the inductor 4 via switches 5.1, 5.2, 5.3, i.e. the switches are closed, the result is a total high-frequency output because the oscillators are now connected in parallel.

In the event of an oscillator breaking down the other two oscillators are able to continue acting on the inductor 4. The block diagram further shows a control cabinet 6 including operating units and a process control system 7.

What is claimed is:

1. An apparatus for melting and refining glass and ceramic compounds, excluding metals, and also for heating the compounds for crystal growing, comprising:
    a crucible for receiving the compound to be heated;
    a high frequency system for heating the compound by means of supplying high frequency energy to the compound in the crucible, said high frequency system comprising: a first high frequency self-excited oscillation circuit having an induction coil looping around said crucible and a capacitor connectable to said induction coil, and at least a second high frequency self-excited oscillation circuit comprising said induction coil and a second capacitor connectable to said induction coil;
    each capacitor comprising an individual capacitor battery which is housed in an oscillator housing separate from oscillator housings of other capacitor batteries;
    each of said capacitor batteries together with said induction coil being operable as an oscillation circuit without the necessity of a change of remaining oscillation circuits.

2. The apparatus of claim 1 wherein said capacitors are connectable to said induction coil individually or jointly.

3. The apparatus of claim 2 wherein three said oscillation circuits are provided.

4. The apparatus of claim 1 wherein three said oscillation circuits are provided.

5. The apparatus of claim 1 wherein each said oscillation circuit includes a power pack connected to the respective capacitor battery.

6. The apparatus of claim 5 wherein said power packs have direct current outputs.

* * * * *